Figure 1:
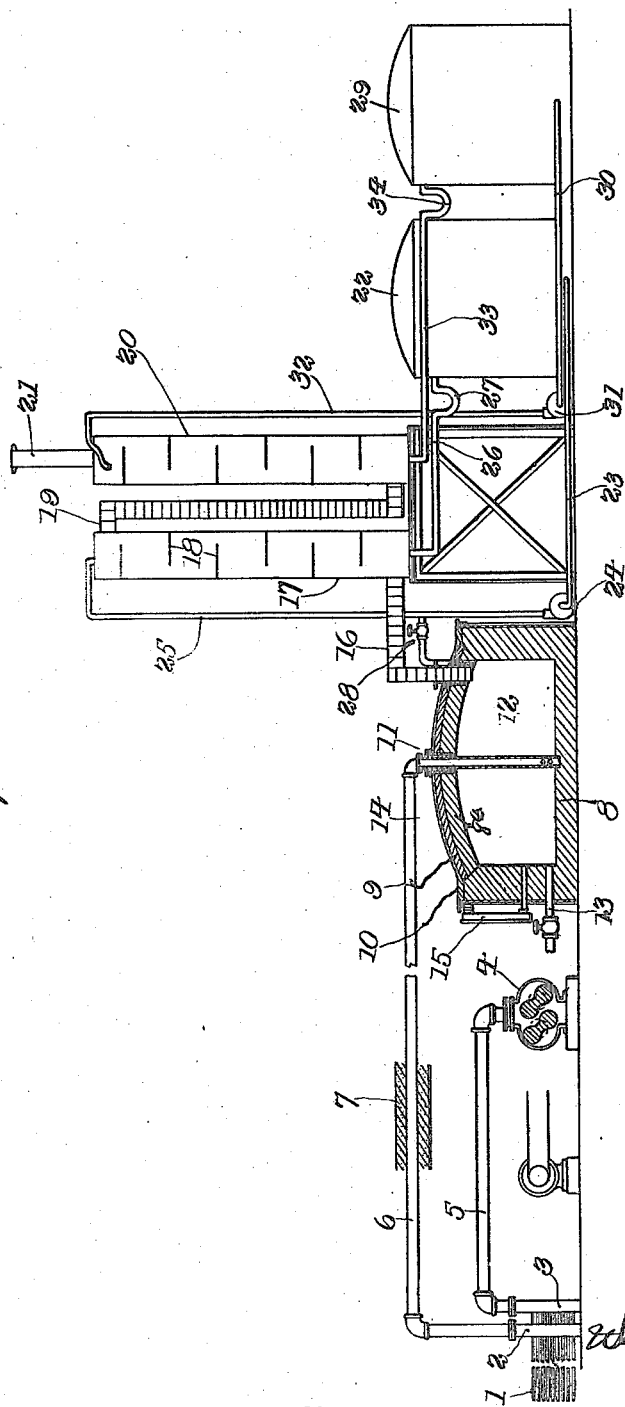

W. A. SLATER.
CONCENTRATION AND PURIFICATION OF SLUDGE ACID.
APPLICATION FILED MAY 18, 1917.

1,263,950.

Patented Apr. 23, 1918.

2 SHEETS—SHEET 1.

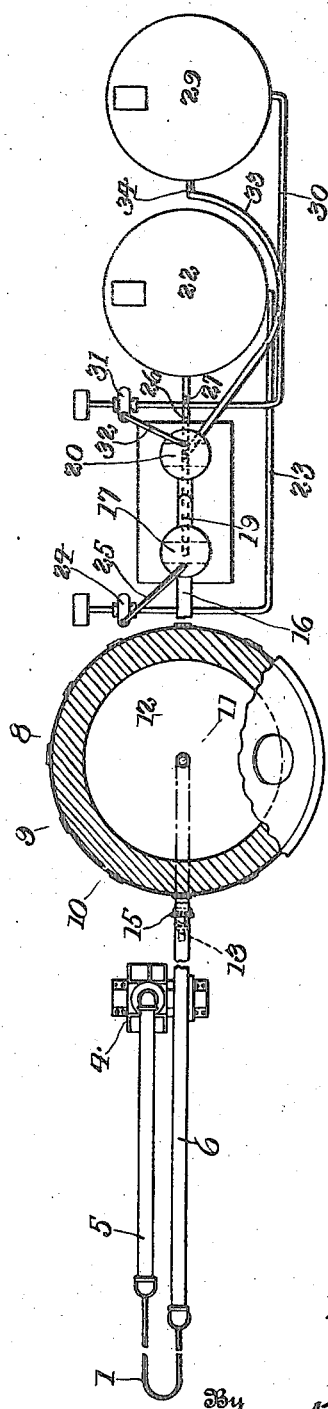

UNITED STATES PATENT OFFICE.

WILLIAM A. SLATER, OF FORT WORTH, TEXAS, ASSIGNOR TO GULF REFINING COMPANY, OF PITTSBURGH, PENNSYLVANIA, A CORPORATION OF TEXAS.

CONCENTRATION AND PURIFICATION OF SLUDGE ACID.

1,263,950.    Specification of Letters Patent.    Patented Apr. 23, 1918.

Application filed May 16, 1917. Serial No. 169,525.

*To all whom it may concern:*

Be it known that I, WILLIAM A. SLATER, a citizen of the United States, residing at Fort Worth, in the county of Tarrant and State of Texas, have invented certain new and useful Improvements in the Concentration and Purification of Sludge Acid, of which the following is a specification.

This invention relates to the concentration and purification of sludge acid; and it comprises a method of concentrating and recovering weak sulfuric acid formed by dilution of sludge from petroleum refineries wherein such weak acid is treated with hot air in a plurality of stages, the hot air first passing through a very hot more or less concentrated acid and thereafter passing less concentrated acid in countercurrent, such air being finally scrubbed with water to recover acid carried forward; and it also comprises as a new organization of apparatus elements an acid recovering plant comprising means for heating air to a high temperature, means for passing the so heated air through a body of hot sulfuric acid, means for then passing the air in countercurrent against less concentrated sulfuric acid, means for supplying the sulfuric acid which has been treated in countercurrent, continuously or intermittently, to the body of sulfuric acid with which the air first contacts, and means for scrubbing effluent air with water in countercurrent; all as more fully hereinafter set forth and as claimed.

In the refining of petroleum oil, the oils are always treated with surfuric acid which has for its function withdrawing certain impurities and undesirable components of the oil. When the treatment is complete, the acid and the withdrawn matters settle out as a heavy sludge which is separated from the refined oils. This sludge is ordinarily treated with water which causes a separation into an oily layer (sludge oil) and an aqueous layer containing sulfuric acid and also many other bodies, sludge acid. It is desirable to recover sulfuric acid from this sludge acid in a state fitting it for reuse, but recovery presents a number of difficult problems. The acid contains so much organic matter that on heating it the sulfuric acid is reduced to a greater or less extent with production of $SO_2$ which escapes; the dissolved organic matters effecting the reduction.

I have found that if I effect the concentration of this waste acid by hot air in a methodical manner, not only do I not create a nuisance, as is the case in the ordinary methods of concentration, but I avoid the stated loss. Instead of forming great volumes of sulfur dioxid in the concentration of the acid by the reaction between the dissolved organic matter and the $H_2SO_4$ little or no dioxid is formed, although in the end I obtain a strong acid substantially free of dissolved organic matter. There is separated granular carbon in the final product but this product does not contain dissolved organic matter to any substantial extent and is adapted for reuse in purifying oils, without any further treatment, such carbon as it contains being harmless and being taken up by the new sludge formed. I attribute these results to "autoxidation" of the organic matters in the hot concentrating acid by the hot air; the sulfur dioxid which tends to form and the organic matter probably oxidizing simultaneously in the manner usual in autoxidations.

In the best embodiment of my invention I dilute the sludge with water, using for this purpose the scrubbing water from an operation hereinafter described, since this enables me to utilize a portion of the acid which would otherwise be lost. The diluted sludge is allowed to settle in the usual way giving me weak acid of about 42° Baumé and sludge oil. With the sludge oil I am not further concerned in this invention. The weak acid is next caused to circulate in a cyclic manner against a countercurrent of heated air from a further operation. It is advantageous to place the acid in a tank and circulate continuously by means of a pump down through a tower-like structure provided with plates or other film forming devices against an ascending current of hot air. In this operation the acid in the tank and in circulation is kept heated to about 200° F. by the heat of the air. In the circulation it may lose about 10 per cent. of its water. During this circulation oxidation goes on but there is no material loss of sulfur as $SO_2$. The air escaping from contact with the acid in this operation is next best scrubbed in countercurrent with water; this water, which picks up some acid being subsequently used for dilution of the original sludge. From time to time, or continuously, the acid which has undergone aeration and concentration in the tower-like structure is transferred to a chamber where hot air is blown through it at a much higher temperature; the final temperature of the acid going advantageously as high as 350° F. Air blowing in this apparatus is continued until the acid reaches a Baumé degree of about 66. The hot air escaping from this treatment may be, and advantageously is, used for the first aeration of the weak acid just described. While the air used in blowing the acid and aeration may be heated in other ways, I find it advantageous to secure the heat by locating heating coils in the waste gas flues from petroleum stills or boiler furnaces, since the air may here be brought to a temperature above the boiling point of sulfuric acid in this method of concentrating.

In the accompanying illustration I have shown more or less diagrammatically an organization of apparatus elements within the present invention and susceptible of use in the performance of the described process.

In this showing, Figure 1 is a view in vertical section, certain parts being shown in elevation, of a complete plant; and Fig. 2 is a fragmentary view, partly in horizontal section and partly in plan of the structure shown in Fig. 1.

In this showing, element 1 designates an air heater which may be as shown a number of return bends of iron pipe or the like passed between the headers 2 and 3 and located in a source of heat (not shown) such as a waste gas flue, a furnace flue, etc. Air is furnished by blower 4 through conduit 5, and after heating passes through conduit 6, suitably heat insulated by 7 to the concentrating apparatus. As shown the concentrator into which the hot air first passes, is a tank-like structure or chamber 8 composed of arched acid proof brick 8ᵃ and a suitable bonding material 9, the walls being sufficiently thick to prevent great loss of heat. It may be externally covered or braced by steel plates 10 in order to prevent loss of acid in case of cracking of the brickwork. Within the concentrator, as shown, is an air conduit 11 which may be a cast iron pipe or other acid resistant variety of iron perforated toward its bottom at 12 and resting on the bottom of the concentrator or set in the bottom as shown. The total area of the perforations 12 may be about 10 per cent. greater than the cross-sectional area of the pipe. The concentrator is provided with valved outlet 13 for removing concentrated acid, manhole 14 for cleaning and thermometer or pyrometer 15 for observing the temperature. In use the concentrator is kept about half full of acid. After passing through the hot acid in the concentrator the heated air which still retains much of its high temperature and which carries forward some acid, goes through conduit 16 into the base of a tower-like structure 17 serving as aerator and concentrator. As shown, this tower is provided with alternating shelves 18, although any other type of filling or filming device which does not tend to clog may be used. Passing up through this tower the air escapes at the top by conduit 19 which leads it to the base of a similar tower 20 also provided with shelves or the like. Passing up through this second tower, the air finally escapes at the top through outlet 21. It may be discharged into the atmosphere as it does not carry any substantial amount of sulfur dioxid or other injurious or offensive gases. Connected with the first of the aerating or concentrating towers is a system for cyclically circulating weak acid therethrough. This system comprises tank 22, outlet conduit 23 leading to pump 24 and line 25. Line 25 discharges the acid into the top of the aerating tower, down through which it passes to the base in counter current against the hot air coming from the concentrator. From the bottom of the aerating tower the weak acid is taken by conduit 26 past trap 27 back into the tank. From time to time, or continuously, as the case may be, weak acid in transit may be taken by valved line 28 into the concentrator. The second or scrubbing tower is provided with a system for the cyclic circulation of scrubbing water therethrough, this system comprising a tank 29 having outlet conduit 30 leading to pump 31 and riser 32 which leads water from the tank into the top of the scrubbing tower. At the bottom of the scrubbing tower the water is led through conduit 33 past trap 34 back to the tank.

In the use of the described structure tank 29 is charged with water which is kept in cyclic circulation through the scrubbing tower. Tank 22 is charged with separated weak acid and this acid is kept in circulation through the aerating tower in the described manner. Concentrator 8 is charged with a stronger acid. The hot air bubbling into the strong acid in 8 concentrates it while keeping it in agitation. Such carbon as separates out will become so finely divided because of the agitation that it does not settle to the bottom but remains in suspension and may be drawn off with the acid. The acid in the concentrator becomes more and more concentrated and hotter as the air passes through it until its temperature reaches about 350° F. It has been found, however, that this final or finishing temperature is somewhat variable, so in practice after the acid has reached, say 320° F., the acid is tested from time to time until it reaches a density of 66° Bé. When finally concentrated to this point it is discharged and new acid is admitted through 28. The operation, however, may be continuous, acid being continuously withdrawn and continuously admitted at 28. Carbon separates from the acid in circulation through the aeration tower; separating in a rather peculiar form as brittle, round balls. This carbon settles at the bottom of tank 22 and is removed from time to time by cleaning. In normal operation the acid in tank 22 is at a temperature of about 200° F.

The described process and apparatus may be used for treating separated acid which has been stored. Stored acid in time undergoes changes which render it unsuited for concentration by most methods of the prior art; but it may be handled as readily in the present invention as fresh separated acid.

What I claim is:—

1. The process of recovering sludge acid which comprises passing the weak acid in countercurrent against heated air and thereafter passing air at a higher temperature through the so-treated acid.

2. The process of recovering sludge acid which comprises passing a flowing body of weak acid in cyclic circulation against a countercurrent of heated air till such acid is somewhat concentrated and impurities oxidized and then passing air at a higher temperature through the so-concentrated acid till the desired degree of concentration is effected.

3. The process of recovering sludge acid which comprises passing a flowing body of weak acid in cyclic circulation against a countercurrent of heated air till such acid is somewhat concentrated and impurities oxidized and then passing air at a higher temperature through the so-concentrated acid till the desired degree of concentration is effected, air at a high heat being first passed through the second stated body and thereafter passed in countercurrent against the first stated body.

4. The process of recovering sludge acid which comprises passing heated air in countercurrent against a flowing body of weak acid at a temperature around 200° F., and then passing air through a body of so-treated acid at a higher temperature till it acquires the desired degree of concentration.

5. In the treatment of separated sludge acid, the process which comprises blowing highly heated air therethrough to concentrate it and oxidize impurities, such air blowing being continued until the acid reaches a concentration of about 66° Baumé.

6. In the concentration of sludge acid, the process which comprises highly heating air, leading it through hot acid to concentrate and oxidize the same, then over weaker acid in countercurrent, and finally in countercurrent against water.

7. In the utilization of acid sludge, the process which comprises separating sludge by water containing some acid and coming from a later stage in the operation and thereby producing an acid liquid, highly heating air, blowing the hot air through a body of relatively hot strong recovered acid to concentrate said acid and oxidize impurities therein, passing the escaping air in countercurrent against said acid liquid to concentrate it, said acid being then transferred to the body of acid first treated by air-blowing and finally scrubbing the air with water to furnish the acid-containing water for the initial separation.

8. In an acid recovery plant, means for heating air, means for passing the hot air through a body of acid, means for passing the so-passed air in countercurrent against a body of weaker acid, means for transferring the treated weaker acid to the first mentioned body of acid and means for finally scrubbing the air.

9. In an acid recovery plant, means for heating air, a concentrating chamber, means for passing the hot air through acid in the chamber, a tower-like device provided with film forming means, a conduit leading air from the chamber to the base of said tower, means for passing acid in cyclic circulation through said tower in countercurrent against the air and means for transferring acid from the cyclic circulation to said chamber.

10. In an acid recovery plant, means for heating air, a concentration chamber, means for passing hot air through acid in the chamber, a tower-like device provided with film forming means, a conduit leading air from the chamber to the base of said tower, means for passing acid in cyclic circulation through said tower in countercurrent against the air, means for transferring acid from said cyclic circulation to said chamber, a second tower-like device, means for leading air from the top of the first tower-like device to the base of the second tower-like structure and means for circulating water through said second tower-like structure.

In testimony whereof, I affix my signature hereto.

WM. A. SLATER.